(12) United States Patent
Jayaramachar et al.

(10) Patent No.: US 12,075,343 B2
(45) Date of Patent: Aug. 27, 2024

(54) METHODS, SYSTEMS, AND COMPUTER READABLE MEDIA FOR NETWORK SLICE SELECTION FUNCTION RECOVERY

(71) Applicant: Oracle International Corporation, Redwood Shores, CA (US)

(72) Inventors: Amarnath Jayaramachar, Bangalore (IN); Kawal Sapra, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 413 days.

(21) Appl. No.: 17/572,559

(22) Filed: Jan. 10, 2022

(65) Prior Publication Data

US 2023/0224804 A1    Jul. 13, 2023

(51) Int. Cl.
*H04W 48/18* (2009.01)
*H04W 8/02* (2009.01)
*H04W 28/02* (2009.01)
*H04W 48/16* (2009.01)

(52) U.S. Cl.
CPC ............. *H04W 48/18* (2013.01); *H04W 8/02* (2013.01); *H04W 28/0284* (2013.01); *H04W 28/0289* (2013.01); *H04W 48/16* (2013.01)

(58) Field of Classification Search
CPC .............................. H04W 48/18; H04W 48/16
See application file for complete search history.

(56) References Cited

U.S. PATENT DOCUMENTS

2023/0013720 A1\* 1/2023 Gupta .................. H04W 12/08
2023/0121491 A1\* 4/2023 Long .................. H04W 36/0038
                                                                    455/411

OTHER PUBLICATIONS

"3rd Generation Partnership Project; Technical Specification Group Core Network and Terminals; 5G System; Network Function Repository Services; Stage 3 (Release 17)," 3GPP TS 29.510, V17.3.0, pp. 1-271 (Sep. 2021).

"5G; 5G System; Network Slice Selection Services; Stage 3 (3GPP TS 29.531 version 16.3.0 Release 16)," ETSI TS 129.531, V16.3.0, pp. 1-64 (Jul. 2020).

\* cited by examiner

*Primary Examiner* — Zhiren Qin
(74) *Attorney, Agent, or Firm* — Jenkins, Taylor & Hunt, P.A.

(57) ABSTRACT

Methods, systems, and computer readable media for network slice selection function (NSSF) recovery. A method includes creating, at an NSSF, subscriptions for a number of access and mobility management functions (AMFs) and storing availability information for each AMF. The method includes determining, at the NSSF, that the NSSF failed to process at least one service update message from at least one of the AMFs, and in response, sending a notification request message to each of the AMFs, the notification request message requesting each AMF to update availability information for the AMF. The method includes receiving, at the NSSF, updated availability information from each of the AMFs. The method includes distributing, at the NSSF, the updated availability information to each of the AMFs.

20 Claims, 6 Drawing Sheets

| Attribute Name/Header Names | Data type | P | Cardinality | Description |
|---|---|---|---|---|
| NSSAIAvailabilityUpdateRequired | Boolean | O | 1 | Indication for AMF to resend the NSSAI Availability information. |

METHODS, SYSTEMS, AND COMPUTER READABLE MEDIA FOR NETWORK SLICE SELECTION FUNCTION RECOVERY

TECHNICAL FIELD

The subject matter described herein relates to telecommunications networks. More particularly, the subject matter described herein relates to methods, systems, and computer readable media for network slice selection function (NSSF) recovery.

BACKGROUND

In fifth generation (5G) communications networks, the network node that provides service is referred to as a producer network function (NF). A network node that consumes services is referred to as a consumer NF. A network function can be both a producer NF and a consumer NF depending on whether it is consuming or providing service.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. Consumer NFs can subscribe to receive information about producer NF instances that have registered with the NRF.

A network slice selection function (NSSF) provides network slicing services for devices seeking to access specific network capabilities and characteristics associated with a network slice. An access and mobility management function (AMF) performs mobility management operations similar to those performed by a mobility management entity (MME) in 4G networks. AMFs can subscribe to updates from the NSSF; however, the subscribed AMFs may not receive these updates if the NSSF fails to process some update messages.

In light of these and other difficulties, there exists a need for methods, systems, and computer readable media for NSSF recovery.

SUMMARY

Methods, systems, and computer readable media for NSSF recovery. A method includes creating, at an NSSF, subscriptions for a number of access and mobility management functions (AMFs) and storing availability information for each AMF. The method includes determining, at the NSSF, that the NSSF failed to process at least one service update message from at least one of the AMFs, and in response, sending a notification request message to each of the AMFs, the notification request message requesting each AMF to update availability information for the AMF. The method includes receiving, at the NSSF, updated availability information from each of the AMFs. The method includes distributing, at the NSSF, the updated availability information to each of the AMFs.

According to another aspect of the subject matter described herein, the availability information comprises network slice selection assistance information.

According to another aspect of the subject matter described herein, determining that the NSSF failed to process at least one service update message comprises determining that the NSSF implemented a traffic shedding policy in response to detecting an overload condition.

According to another aspect of the subject matter described herein, determining that the NSSF failed to process at least one service update message comprises determining that the NSSF was unavailable for a period of time.

According to another aspect of the subject matter described herein, creating the plurality of subscriptions comprises receiving a subscribe service operation request message from each AMF.

According to another aspect of the subject matter described herein, storing availability information for each AMF comprises receiving a network slice selection assistance information (NSSAI) availability PUT request from each AMF.

According to another aspect of the subject matter described herein, the method includes, after creating the plurality of subscriptions, receiving a network slice selection assistance information (NSSAI) availability PATCH request from at least one AMF and storing new availability information for the at least one AMF.

According to another aspect of the subject matter described herein, the method includes, after creating the plurality of subscriptions, receiving a network slice selection assistance information (NSSAI) availability update resulting from a telecommunications network operator configuration and distributing the NSSAI availability update to each of the AMFs.

According to another aspect of the subject matter described herein, sending the notification request message to each of the AMFs comprises including data requesting updated availability information in the form of a header or data attribute of a notify service operation message.

According to another aspect of the subject matter described herein, a system for network slice selection function (NSSF) recovery includes at least one processor and memory storing instruction for the at least one processor. The system includes a NSSF implemented by the at least one processor and configured for: creating subscriptions for a number of access and mobility management functions (AMFs) and storing availability information for each AMF; determining that the NSSF failed to process at least one service update message from at least one of the AMFs, and in response, sending a notification request message to each of the AMFs, the notification request message requesting each AMF to update availability information for the AMF; receiving updated availability information from each of the AMFs; and distributing the updated availability information to each of the AMFs.

According to another aspect of the subject matter described herein, the availability information comprises network slice selection assistance information.

According to another aspect of the subject matter described herein, determining that the NSSF failed to process at least one service update message comprises determining that the NSSF implemented a traffic shedding policy in response to detecting an overload condition.

According to another aspect of the subject matter described herein, determining that the NSSF failed to process at least one service update message comprises determining that the NSSF was unavailable for a period of time.

According to another aspect of the subject matter described herein, creating the plurality of subscriptions comprises receiving a subscribe service operation request message from each AMF.

According to another aspect of the subject matter described herein, storing availability information for each AMF comprises receiving a network slice selection assistance information (NSSAI) availability PUT request from each AMF.

According to another aspect of the subject matter described herein, the NSSF is configured for, after creating the plurality of subscriptions, receiving a network slice selection assistance information (NSSAI) availability PATCH request from at least one AMF and storing new availability information for the at least one AMF.

According to another aspect of the subject matter described herein, the NSSF is configured for, after creating the plurality of subscriptions, receiving a network slice selection assistance information (NSSAI) availability update resulting from a telecommunications network operator configuration and distributing the NSSAI availability update to each of the AMFs.

According to another aspect of the subject matter described herein, sending the notification request message to each of the AMFs comprises including data requesting updated availability information in the form of a header or data attribute of a notify service operation message.

According to another aspect of the subject matter described herein, one or more non-transitory computer readable media have stored thereon executable instructions that when executed by at least one processor of a computer cause the computer to perform steps comprising creating, at an NSSF, a plurality of subscriptions for a plurality of access and mobility management functions (AMFs) and storing availability information for each AMF; determining, at the NSSF, that the NSSF failed to process at least one service update message from at least one of the AMFs, and in response, sending a notification request message to each of the AMFs, the notification request message requesting each AMF to update availability information for the AMF; receiving, at the NSSF, updated availability information from each of the AMFs; and distributing, at the NSSF, the updated availability information to each of the AMFs.

The subject matter described herein can be implemented in software in combination with hardware and/or firmware. For example, the subject matter described herein can be implemented in software executed by a processor. In one example implementation, the subject matter described herein may be implemented using a computer readable medium having stored thereon computer executable instructions that when executed by the processor of a computer control the computer to perform steps.

Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 4 is a table illustrating example attribute names and values for a notification message;

DETAILED DESCRIPTION

The subject matter described herein relates to methods, systems, and computer readable media for network slice selection function (NSSF) recovery.

During deployments of telecommunications networks, typically multiple access and mobility management functions (AMFs) are deployed and configured to receive service from an NSSF. For example, each AMF can send its network slice selection availability information (NSSAI) the NSSF using 3GPP defined operations. Other AMFs can subscribe for the NSSAI availability updates, e.g., updates due to updates from other AMFs or through telecommunications network operator configuration.

In some cases, the NSSF may go out of service due to any of various reasons, for example, process crash, overload, database connectivity failures or any other similar situations where the NSSF is unable to process the incoming NSSAI availability update requests coming from the AMFs. When the NSSF goes out of service, there could be multiple updates that will be missed to be applied on the NSSF storage on the NSSAI availability information and eventually also missed to notify other AMFs on the NSSAI availability update.

When the NSSF recovers from these failures, then there will be a discrepancy between the NSSAI availability information among multiple AMFs (an AMF that updated the NSSAI and some other AMF that is expecting the update notification) and between AMFs and the NSSF. With the stale data at the NSSF and AMFs, there is a possibility of a service outage. There is no 3GPP defined mechanism at the NSSF to request AMFs to resend the updated data during the duration when NSSF was out of service.

This document describes a solution where, upon NSSF recovery from any failure scenarios, the NSSF can trigger a notification request towards the AMF for the valid subscriptions at NSSF. In the notification request, the NSSF includes a new optional indication. Upon receiving the notification trigger with optional indication, an AMF can trigger an NSSAI availability request towards the NSSF with the updated NSSAI availability information. The NSSF can then process the request by updating the storage and trigger a notification to all the subscribed AMFs.

Figure 1:
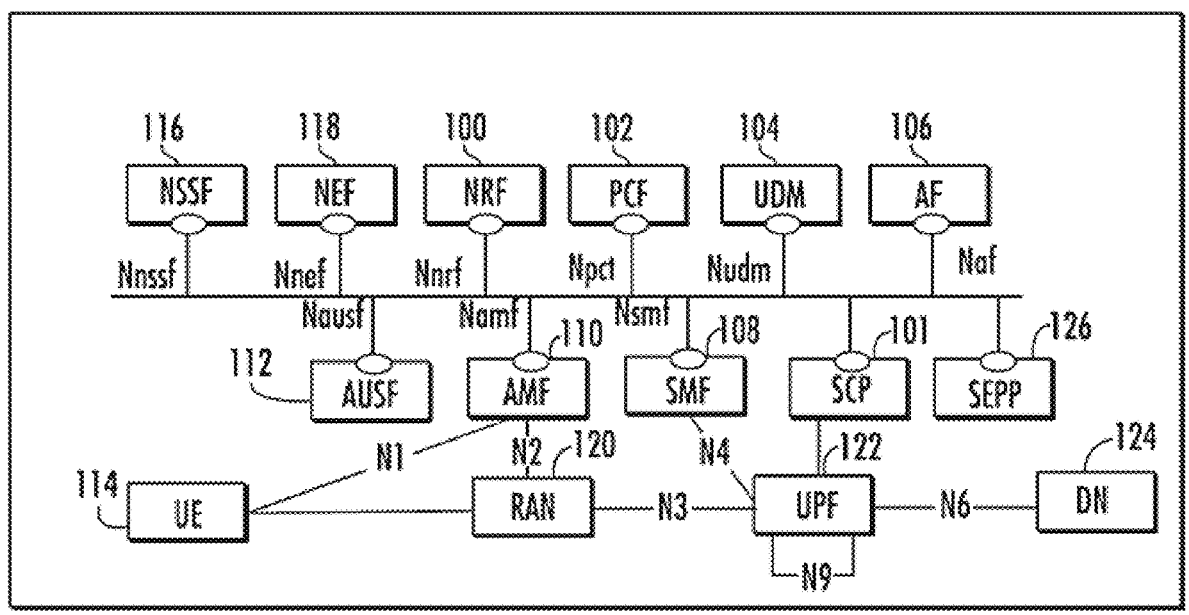
FIG. 1 is a block diagram illustrating an example 5G system network architecture.

FIG. 1 is a block diagram illustrating an example 5G system network architecture. The architecture in FIG. 1 includes NRF 100 and SCP 101, which may be located in the same home public land mobile network (HPLMN). NRF 100 may maintain profiles of available producer NF service instances and their supported services and allow consumer NFs or SCPs to subscribe to and be notified of the registration of new/updated producer NF service instances.

SCP 101 may also support service discovery and selection of producer NF instances. SCP 101 may perform load balancing of connections between consumer and producer NFs. In addition, using the methodologies described herein, SCP 101 may perform preferred NF location based selection and routing.

NRF 100 is a repository for NF or service profiles of producer NF instances. In order to communicate with a producer NF instance, a consumer NF or an SCP must obtain the NF or service profile or the producer NF instance from NRF 100. The NF or service profile can be a JavaScript object notation (JSON) data structure as defined in 3GPP Technical Specification (TS) 29.510.

In FIG. 1, any of the nodes (other than NRF 100) can be either consumer NFs or producer NFs, depending on whether they are requesting or providing services. In the illustrated example, the nodes include a policy control function (PCF) 102 that performs policy related operations in a network, a user data management (UDM) function 104 that manages user data, and an application function (AF) 106 that provides application services.

The nodes illustrated in FIG. 1 further include a session management function (SMF) 108 that manages sessions between access and mobility management function (AMF) 110 and PCF 102. An authentication server function (AUSF) 112 performs authentication services for user equipment (UEs), such as user equipment (UE) 114, seeking access to the network.

AMF 110 performs mobility management operations similar to those performed by a mobility management entity (MME) in 4G networks. AMF 110 can perform, e.g., registration management, reachability management, connection management, and mobility management.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality.

UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a visitor PLMN which manages security for the visitor PLMN. Thus, traffic between NFs in different PLMNs may traverse two SEPP functions, one for the home PLMN and the other for the visitor PLMN.

A network slice selection function (NSSF) 116 provides network slicing services for devices seeking to access specific network capabilities and characteristics associated with a network slice. Network slices enables users to select customized networks with different functionality (e.g., mobility) and/or performance requirements (e.g., latency, availability, reliability). Network slices may differ for supported features and network function optimizations. In such cases, network slices may have different S-NSSAIs with different slice and service types. The user can deploy instances of multiple network slices delivering exactly the same features but for different groups of UEs. As these instances deliver a different committed service because they are dedicated to a customer, in which case such network slices may have different S-NSSAIs with the same slice or service type but different slice differentiators.

NSSF 116 can support one or more of the following functionalities:

NSSF 116 enables AMF 110 to perform initial registration and PDU session establishment.

NSSF 116 uses AMF 110 to update the S-NSSAI(s) the AMF supports and notify any change in status.

NSSF 116 selects the network slicing instance (NSI) and determines the authorized Network Slice Selection Assistance Information (NSSAIs) and AMF 110 to serve the UE.

NSSF 116 interaction with NRF 100 allows retrieving specific NF services to be used for registration request.

NSSF 116 can be responsible for providing the following information as and when queried by AMF 110:

Allowed NSSAIs

Configured NSSAIs

Restricted NSSAIs

Candidate AMF List (in case of registration)

Network Slice instance ID (for PDU registration)

Slice-level NRF information (for PDU Connectivity)

NSSF 116 can support the above functions through the following NSSF services:

Network Slice Selection service (Nnssf_NSSelection): This service is used by an NF Service Consumer (AMF) to retrieve the information related to network slice. Network Slice Selection Service enables Network Slice selection in the serving Home Public Land Mobile Network (HPLMN).

NS-Availability Service (Nnssf_NSAvailability): This service is used by an NF Service Consumer (AMF) to update the S-NSSAI(s) the AMF supports on a per TA basis on the NSSF. Also, to notify any change in status, on a per TA basis, of the SNSSAIs available per TA (unrestricted) and the restricted SNSSAI(s) per PLMN in that TA in the serving PLMN of the UE.

NSSF 116 can be configured such that, upon recovery from any failure scenarios, NSSF 116 can trigger a notification request towards subscribed AMFs. In the notification request, NSSF 116 includes a new optional indication. Upon receiving the notification trigger with optional indication, an AMF can trigger an NSSAI availability request towards NSSF 116 with the updated NSSAI availability information. NSSF 116 can then process the request by updating the storage and trigger a notification to all the subscribed AMFs.

Figure 2:
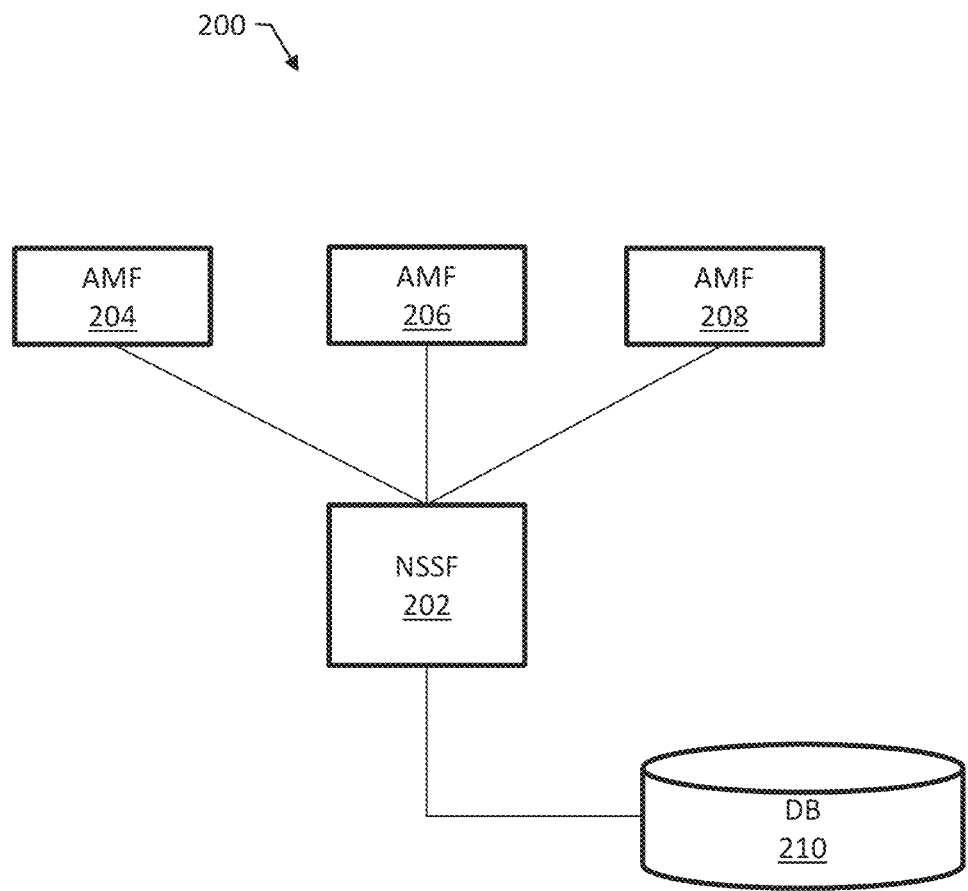
FIG. 2 is a block diagram showing an example deployment of a NSSF and multiple AMFs.

FIG. 2 is a block diagram showing an example deployment 200 of a NSSF 202 and multiple AMFs 204, 206, and 208. Each of AMFs 204, 206, and 208 is configured to send NSSAI availability information to NSSF 202, for example, as described in 3GPP Technical Specification TS 29.531. Each of AMFs 204, 206, and 208 subscribes to NSSF 202 for the NSSAI availability updates reported by other AMFs.

The NSSAI availability information can be updated due to, for example, updates coming from AMFs as well as through operator defined policy configurations. At NSSF 202, the NSSAI availability information is stored persistently to avoid losing data in case NSSF 202 experiences a failure. The NSSAI availability information can be stored, for example, in a database 210.

3GPP technical specification 29.531 section 5.3 states that the Nnssf_NSSAIAvailability service is used by the NF service consumer (e.g., AMF) to update the S-NSSAI(s) the AMF supports on a per TA basis to NSSF 202, subscribe and unsubscribe the notification of any changes to the NSSAI availability information on a per TA basis, of the S-NSSAIs available per TA (unrestricted) and the restricted S-NSSAI (s) per PLMN in that TA in the serving PLMN of the UE.

For the Nnssf_NSSAIAvailability service the following service operations are defined:
1. Update
2. Subscribe
3. Unsubscribe
4. Notify
5. Delete
6. Options 3GPP technical specification 29.531 section 5.3.2.2 explains the update service operation used by an NF Service Consumer (e.g., AMF) to update NSSF 202 with the S-NSSAIs the NF service consumer (e.g. AMF) supports per TA, and get the availability of the S-NSSAIs per TA for the S-NSSAIs the NF service consumer (e.g. AMF) supports. The service consumer (AMF) shall send the NSSAI availability information to NSSF 202. NSSF 202 stores this data for other AMF to use during registration and PDU establishment. In brief, NSSAI availability information is state data updated by the AMF and stored at NSSF 202.

3GPP technical specification 29.531 section 5.3.2.3 explains the subscribe operation used by a NF Service Consumer (e.g., AMF) to subscribe to a notification of any changes in status of the NSSAI availability information (e.g. S-NSSAIs available per TA and the restricted S-NSSAI(s) per PLMN in that TA in the serving PLMN of the UE) upon this is updated by another AMF. In brief, the subscription is for an AMF to get updates from NSSF 202 on NSSAI availability information during modification. The modification of NSSAI Availability can be either be through other AMFs or operator configuration at NSSF 202.

3GPP technical specification 29.510 section 5.3.2.5 explains that the notify service operation shall be used by NSSF 202 to update the NF Service Consumer (e.g., AMF) with any change in status, on a per TA basis, of the S-NSSAIs available per TA (unrestricted) and the S-NSSAIs restricted per PLMN in that TA in the serving PLMN of the UE. In brief, NSSF 202 shall trigger a notification to all of the subscribed AMFs upon any NSSAI availability information update at NSSF 202. This can be due to other AMFs update on NSSAI Availability information or through operator configuration.

In response to NSSF 202 going out of service (for example due to an application crash, NSSF overload, DB connectivity issues or any other similar situations where NSSF 202 is unable to process the incoming NSSAI availability update requests from AMFs 204, 206, and 208), there could be multiple updates that will be missed to be applied to the persistent data on NSSAI availability information. The missed updates could result in missed triggering of the notifications to all the subscribed AMFs on the updated NSSAI availability information.

When NSSF recovers from the failures, then there will be discrepancy between the NSSAI availability information:
among different AMFs, e.g., between an AMF that updated the NSSAI availability information and an AMF that is expecting the update notification by virtue of the subscription.
between AMFs and NSSF 202, because NSSF 202 could not process the incoming NSSAI availability information update request.

Figure 3:
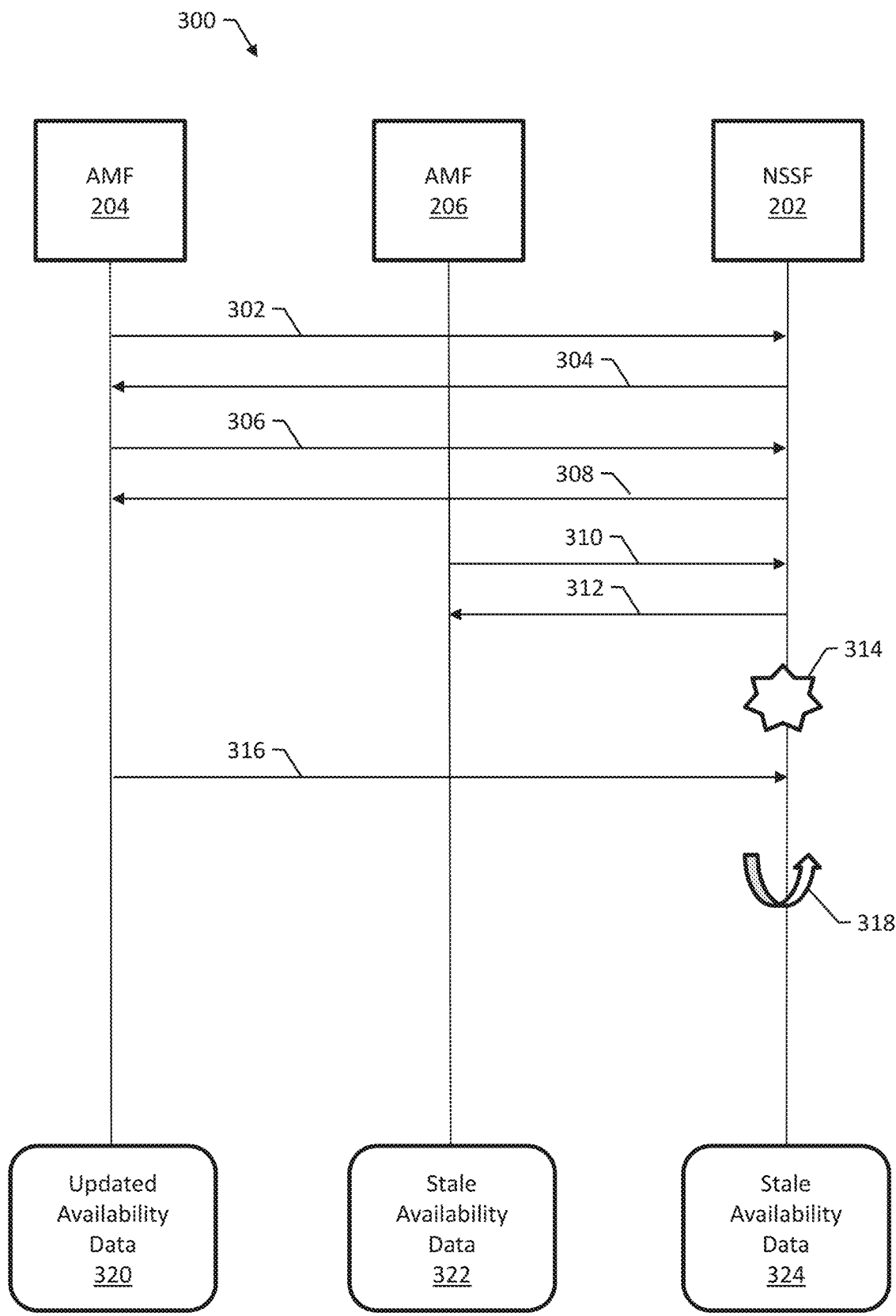
FIG. 3 is a ladder diagram illustrating an exchange of messages between an example NSSF, a first AMF, and a second AMF.

FIG. 3 is a ladder diagram illustrating an exchange of messages 300 between an example NSSF 202, a first AMF 204, and a second AMF 206.

AMF 204 sends a NSSAI availability PUT (create) request message 302 to NSSF 202. NSSF 202 stores the NSSAI availability information persistently in the local storage. NSSF 202 sends a success response message 304.

AMF 204 sends a subscribe request message 306 to NSSF 202 and thereby subscribes for NSSAI availability information updates from NSSF 202. NSSF 202 creates the subscription, for example, by storing an identifier for AMF 204 in a list of subscribed AMFs, and sends a success response message 308 to AMF 204.

AMF 206 sends a subscribe request message 310 to NSSF 202 and thereby subscribes for NSSAI availability information updates from NSSF 202. NSSF 202 creates the subscription, for example, by storing an identifier for AMF 206 in a list of subscribed AMFs, and sends a success response message 312 to AMF 204.

At 314, NSSF 202 becomes unavailable, for example, NSSF 202 crashes or begins shedding traffic due to being overloaded. AMF 204 sends a NSSAI availability PATCH (update) request message 316; however, NSSF 202 is unable to receive or process this message.

At 318, NSSF 202 recovers and becomes available again, for example, by completing a reboot or by exiting an overloaded state. Due to the missed message 316, there is discrepant NSSAI availability information across the network functions.

AMF 204 includes updated availability data 320, and AMF 204 attempted to update NSSF 202 with message 306 but failed due to NSSF 202 being unavailable. AMF 206 includes stale availability data 322 since it did not receive an update from NSSF 202. NSSF 202 includes stale availability data 324 since it was unable to receive or process message 306.

To avoid stale availability data 322 and 324, NSSF 202 can be configured such that, upon NSSF recovery from any failure scenarios, NSSF 202 can trigger a notification request towards subscribed AMFs. In the notification request, NSSF 202 includes a new optional indication. Upon receiving the notification trigger with optional indication, an AMF can trigger an NSSAI availability request towards NSSF 202 with the updated NSSAI availability information. NSSF 202 can then process the request by updating the storage and trigger a notification to all the subscribed AMFs.

In some examples, in response to NSSF 202 failing to process an incoming request due to unavailability, NSSF 202 is configured to:
trigger a notification request towards subscribed AMFs during NssfEventNotification message, NSSF 202 includes an indication of "NSSAIAvailabilityUpdateRequired" (or any other appropriate indication) in the form of header or data attribute This is to inform subscribed AMFs that NSSF 202 does not have the latest NSSAI availability information and is now requesting the latest information. AMFs 204 and 206 are configured to process the notification request with the indication as below:
Upon receiving "NSSAIAvailabilityUpdateRequired" header/data attribute, trigger the NSSAI availability update request towards NSSF with the updated NSSAI Availability information NssfEventNotification is defined in 3GPP technical specification 29.531 section 6.2.6.2.10.

FIG. 4 is a table illustrating example attribute names and values for a notification message 400. Notification message 400 includes an attribute name/header called "NSSAIAvailabilityUpdateRequired" having a data type "Boolean" and cardinality of 1. The attribute is an indication for an AMF to resend NSSAI availability information.

Figure 5:
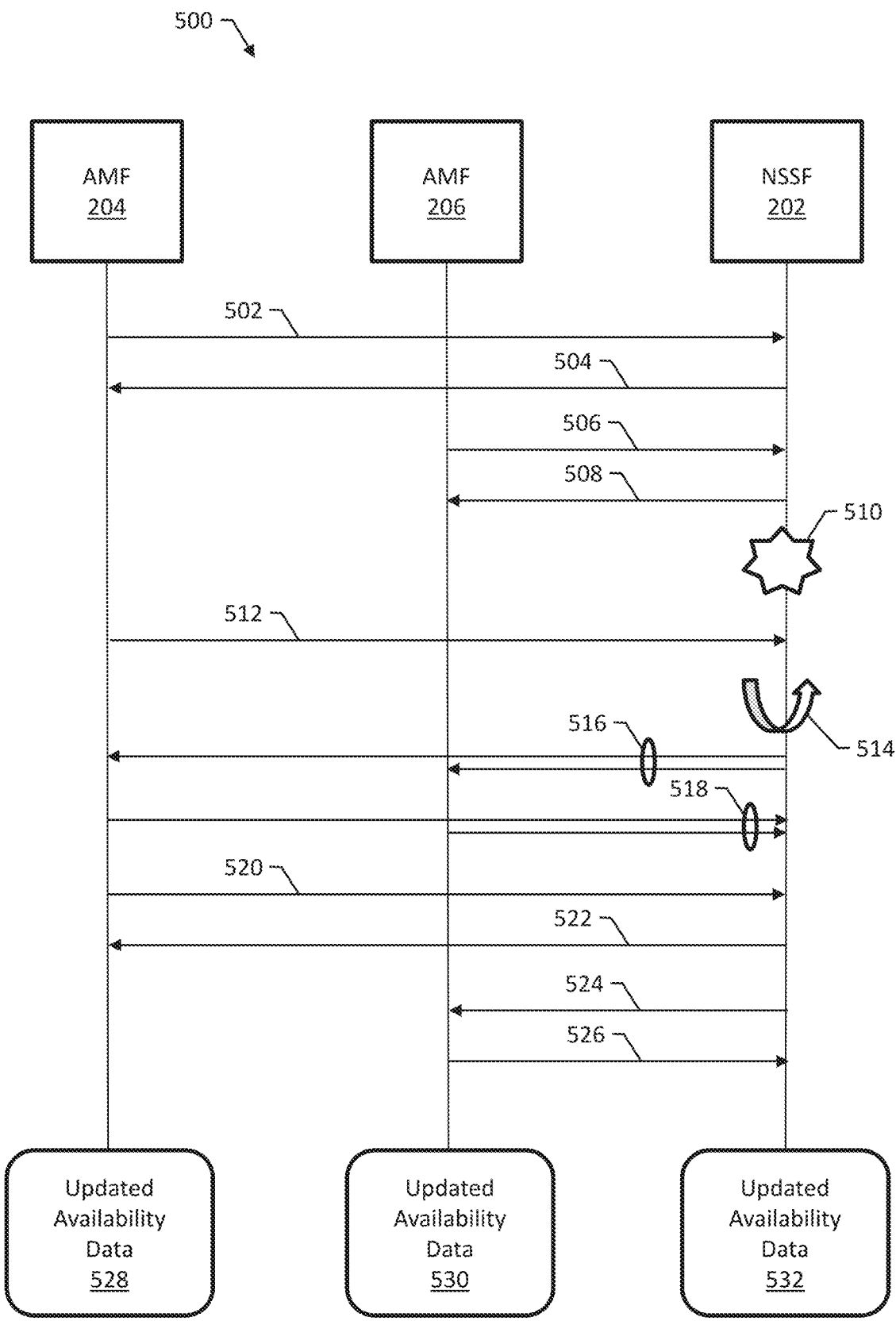
FIG. 5 is a ladder diagram showing an example exchange of messages between an example NSSF, a first AMF, and a second AMF.

FIG. 5 is a ladder diagram showing an example exchange of messages 500 between an example NSSF 202, a first AMF 204, and a second AMF 206. As shown in FIG. 5, NSSF 202 is configured for NSSF recovery using the trigger notification described above. Prior to the exchange 500 shown in FIG. 5, AMF 204 has already subscribed to NSSF 202 for NSSAI availability updates.

AMF 204 sends an availability PUT request message 502 to NSSF 202. NSSF 202 stores the availability data persistently in a database. NSSF 202 sends a success response message 504.

AMF 206 sends a subscribe request message 506 to NSSF 202 and thereby subscribes for NSSAI availability information updates from NSSF 202. NSSF 202 creates the subscription, for example, by storing an identifier for AMF 206 in a list of subscribed AMFs, and sends a success response message 508 to AMF 204.

At 510, NSSF 202 becomes unavailable, for example, NSSF 202 crashes or begins shedding traffic due to being overloaded. AMF 204 sends a NSSAI availability PATCH (update) request message 512; however, NSSF 202 is unable to receive or process this message. At 514, NSSF 202 recovers and becomes available again, for example, by completing a reboot or by exiting an overloaded state.

NSSF 202 triggers a notify request message 516, to each of AMFs 204 and 206, with the update request indication, e.g., "NSSAIAvailabilityUpdateRequired." AMFs 204 and 206 respond with a success response message 518.

AMF 204 processes the notify request message 516 and triggers the NSSAI availability towards NSSF 202 with updated NSSAI availability information by sending another availability PATCH (update) request message 520. NSSF 202 updates the latest NSSAI availability information. NSSF 202 sends a success response message 522 to AMF 204.

NSSF 202 triggers the notification to the subscribed AMFs. In this case, NSSF 202 does not need to send a notification to AMF 204 since AMF 204 provided the update. NSSF 202 sends a notify request message 524 to AMF 206. AMF 206 responds with a success response message 526.

As a result, each of AMF 204, AMF 206, and NSSF 202 has synchronized NSSAI availability data. AMF 204 has updated availability data 528, AMF 206 has updated availability data 530, and NSSF 202 has updated availability data 532.

Figure 6:
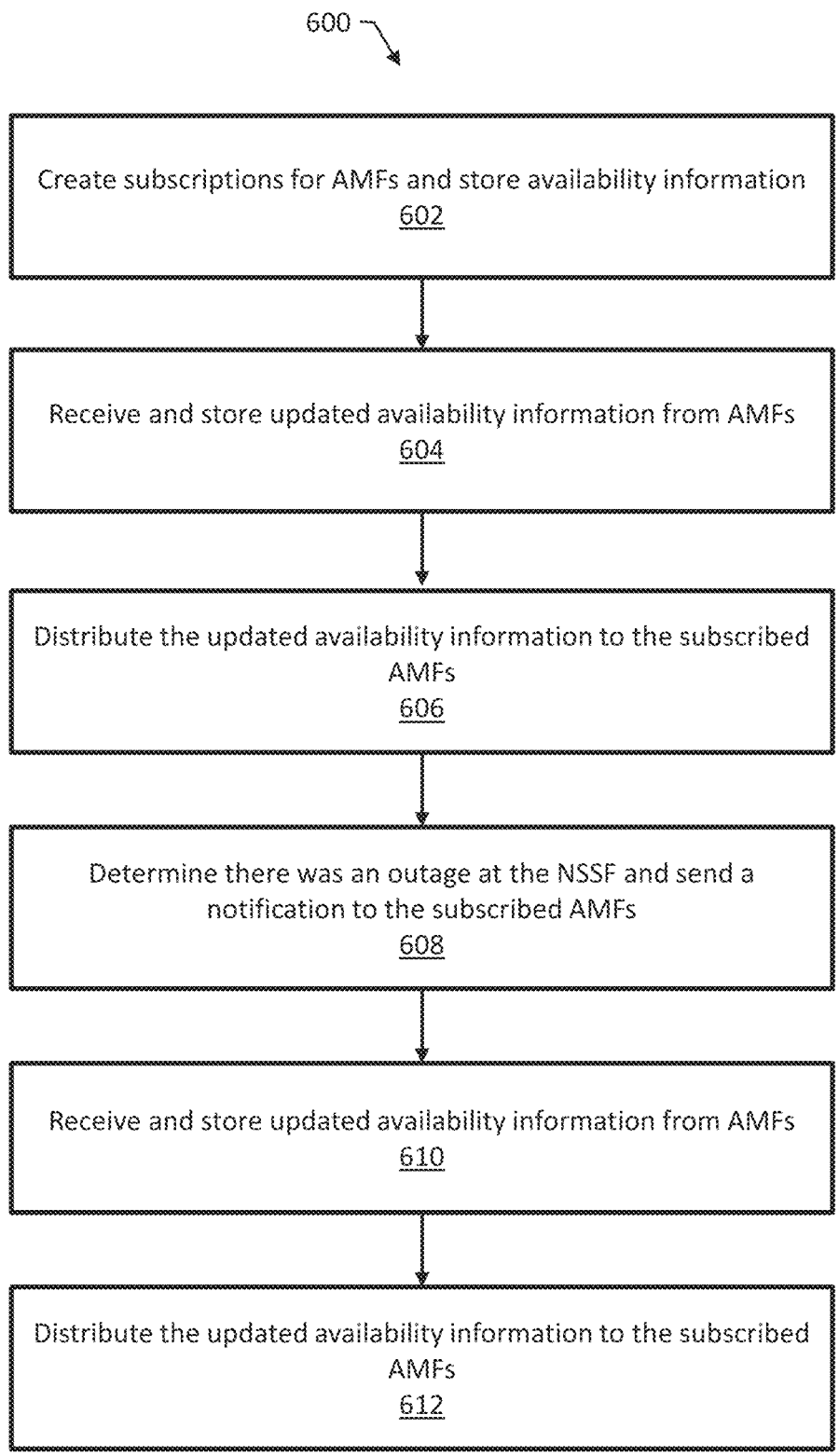
FIG. 6 is a flow diagram of an example method for NSSF recovery.

FIG. 6 is a flow diagram of an example method 600 for NSSF recovery. Method 600 can be performed by one or more NSSFs in a telecommunications network.

Method 600 includes creating, at an NSSF, subscriptions for a number of access and mobility management functions (AMFs) and storing availability information for each AMF (602). The availability information can be, e.g. network slice selection assistance information (NSSAI). Creating the subscriptions can include, e.g., receiving a subscribe service operation request message from each AMF. Storing availability information for each AMF can include receiving a NSSAI availability PUT request from each AMF.

Method 600 includes, after creating the subscriptions, receiving a network slice selection assistance information (NSSAI) availability PATCH request from at least one AMF and storing new availability information for the at least one AMF (604). Method 600 can include, after creating the subscriptions, receiving a network slice selection assistance information (NSSAI) availability update resulting from a telecommunications network operator configuration.

Method 600 includes distributing the NSSAI availability update (from the PATCH request or the operator configuration) to each of the subscribed AMFs (606).

Method 600 includes determining, at the NSSF, that the NSSF failed to process at least one service update message from at least one of the AMFs, and in response, sending a notification request message to each of the AMFs (608). The notification request message includes data requesting each AMF to update availability information for the AMF. Sending the notification request message to each of the AMFs includes, in some examples, including data requesting updated availability information in the form of a header or data attribute of a notify service operation message.

Determining that the NSSF failed to process a service update message generally includes determining that the NSSF experience an outage. For example, determining that the NSSF failed to process at least one service update message can include determining that the NSSF implemented a traffic shedding policy in response to detecting an overload condition. As another example, determining that the NSSF failed to process at least one service update message can include determining that the NSSF was unavailable for a period of time.

Method 600 includes receiving, at the NSSF, updated availability information from each of the AMFs (610) and storing the updated availability information. Method 600 includes distributing, at the NSSF, the updated availability information to each of the AMFs (612).

REFERENCES

The disclosure of each of the following references is incorporated herein by reference in its entirety.
1. 3$^{rd}$ Generation Partnership Project; Technical Specification Group Core Network and Terminals; 5G System; Network Function Repository Services; Stage 3 (Release 17) 3GPP TS 29.510 V17.3.0 (2021 September)
2. 3$^{rd}$ Generation Partnership Project; Technical Specification Group Core Network and Terminals; 5G System; Network Slice Selection Services; Stage 3 3GPP TS 29.531 V16.3.0 (2020 July)

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features.

In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for network slice selection function (NSSF) recovery, the method comprising:

creating, at an NSSF, a plurality of subscriptions for a plurality of access and mobility management functions (AMFs) and storing availability information for each AMF;

determining, at the NSSF, that the NSSF failed to process at least one service update message from at least one of the AMFs, and in response, sending a notification request message to each of the AMFs, the notification request message requesting each AMF to update availability information for the AMF;

receiving, at the NSSF, updated availability information from each of the AMFs; and distributing, at the NSSF, the updated availability information to each of the AMFs.

2. The method of claim 1, wherein the availability information comprises network slice selection assistance information.

3. The method of claim 1, wherein determining that the NSSF failed to process at least one service update message comprises determining that the NSSF implemented a traffic shedding policy in response to detecting an overload condition.

4. The method of claim 1, wherein determining that the NSSF failed to process at least one service update message comprises determining that the NSSF was unavailable for a period of time.

5. The method of claim 1, wherein creating the plurality of subscriptions comprises receiving a subscribe service operation request message from each AMF.

6. The method of claim 1, wherein storing availability information for each AMF comprises receiving a network slice selection assistance information (NSSAI) availability PUT request from each AMF.

7. The method of claim 1, comprising, after creating the plurality of subscriptions, receiving a network slice selection assistance information (NSSAI) availability PATCH request from at least one AMF and storing new availability information for the at least one AMF.

8. The method of claim 1, comprising, after creating the plurality of subscriptions, receiving a network slice selection assistance information (NSSAI) availability update resulting from a telecommunications network operator configuration.

9. The method of claim 8, comprising distributing the NSSAI availability update to each of the AMFs.

10. The method of claim 1, wherein sending the notification request message to each of the AMFs comprises including data requesting updated availability information in the form of a header or data attribute of a notify service operation message.

11. A system for network slice selection function (NSSF) recovery, the system comprising:

at least one processor and memory storing instructions for the at least one processor;

a NSSF implemented by the at least one processor and configured for:

creating a plurality of subscriptions for a plurality of access and mobility management functions (AMFs) and storing availability information for each AMF;

determining that the NSSF failed to process at least one service update message from at least one of the AMFs, and in response, sending a notification request message to each of the AMFs, the notification request message requesting each AMF to update availability information for the AMF;

receiving updated availability information from each of the AMFs; and distributing the updated availability information to each of the AMFs.

12. The system of claim 11, wherein the availability information comprises network slice selection assistance information (NSSAI).

13. The system of claim 11, wherein determining that the NSSF failed to process at least one service update message comprises determining that the NSSF implemented a traffic shedding policy in response to detecting an overload condition.

14. The system of claim 11, wherein determining that the NSSF failed to process at least one service update message comprises determining that the NSSF was unavailable for a period of time.

15. The system of claim 11, wherein creating the plurality of subscriptions comprises receiving a subscribe service operation request message from each AMF.

16. The system of claim 11, wherein storing availability information for each AMF comprises receiving a network slice selection assistance information (NSSAI) availability PUT request from each AMF.

17. The system of claim 11, wherein the NSSF is configured for, after creating the plurality of subscriptions, receiving a network slice selection assistance information (NSSAI) availability PATCH request from at least one AMF and storing new availability information for the at least one AMF.

18. The system of claim 11, wherein the NSSF is configured for, after creating the plurality of subscriptions, receiving a network slice selection assistance information (NSSAI) availability update resulting from a telecommunications network operator configuration and distributing the NSSAI availability update to each of the AMFs.

19. The system of claim 11, wherein sending the notification request message to each of the AMFs comprises including data requesting updated availability information in the form of a header or data attribute of a notify service operation message.

20. One or more non-transitory computer readable media having stored thereon executable instructions that when executed by at least one processor of a computer cause the computer to perform steps comprising:

creating, at an NSSF, a plurality of subscriptions for a plurality of access and mobility management functions (AMFs) and storing availability information for each AMF;

determining, at the NSSF, that the NSSF failed to process at least one service update message from at least one of the AMFs, and in response, sending a notification request message to each of the AMFs, the notification request message requesting each AMF to update availability information for the AMF;

receiving, at the NSSF, updated availability information from each of the AMFs; and distributing, at the NSSF, the updated availability information to each of the AMFs.

* * * * *